United States Patent [19]

Claydon et al.

[11] 4,439,786

[45] Mar. 27, 1984

[54] APPARATUS AND METHOD FOR PROCESSING TELEVISION PICTURE SIGNALS AND OTHER INFORMATION

[75] Inventors: Gyongyver Claydon; Gordon D. Iles, both of Chelmsford, England

[73] Assignee: The Marconi Company Limited, Chelmsford, England

[21] Appl. No.: 320,058

[22] Filed: Nov. 10, 1981

Related U.S. Application Data

[63] Continuation of Ser. No. 79,986, Sep. 28, 1979.

[30] Foreign Application Priority Data

Sep. 29, 1978 [GB] United Kingdom .............. 38677/78

[51] Int. Cl.³ ............................................. H04N 5/04
[52] U.S. Cl. .................................... 358/148; 375/118; 370/100; 370/108
[58] Field of Search .................. 358/8, 148, 160, 127, 358/149; 375/118; 370/100, 108

[56] References Cited

U.S. PATENT DOCUMENTS

| | | | |
|---|---|---|---|
| 3,188,569 | 6/1965 | Mahony | 375/118 |
| 3,351,858 | 11/1967 | Jowett et al. | 375/118 |
| 3,860,952 | 1/1975 | Tallent et al. | 358/8 |
| 4,018,990 | 4/1977 | Long et al. | 358/149 |
| 4,056,851 | 11/1977 | Hovagimyan et al. | 364/900 |
| 4,058,682 | 11/1977 | Donne et al. | |
| 4,208,713 | 6/1980 | Berg | 364/200 |

FOREIGN PATENT DOCUMENTS

| | | |
|---|---|---|
| 945552 | 1/1964 | United Kingdom . |
| 1139042 | 1/1969 | United Kingdom . |
| 1336542 | 11/1973 | United Kingdom . |
| 1378199 | 12/1974 | United Kingdom . |
| 1441607 | 7/1976 | United Kingdom . |
| 1472210 | 5/1977 | United Kingdom . |
| 1556092 | 11/1979 | United Kingdom . |
| 1568379 | 5/1980 | United Kingdom . |

*Primary Examiner*—Richard Murray
*Attorney, Agent, or Firm*—Spencer & Frank

[57] ABSTRACT

A problem arises when simultaneous attempts are made to write and read from the same location in a random access memory. The invention deals with this problem by delaying the writing operations automatically by a varying amount to prevent attempts at simultaneous writing and reading: and preferably to position each write operation approximately mid-way between two read operations.

The invention is particularly applicable to a television synchronizer. In a television synchronizer video information is digitized and then fed into a memory by write clock signals derived from the video information, e.g. from its line synchronizing pulses. It is fed out of the memory by read clock signals derived from some other source.

The invention is also applicable to standards conversion systems, noise reduction systems and picture size reduction and expansion systems.

18 Claims, 3 Drawing Figures

APPARATUS AND METHOD FOR PROCESSING TELEVISION PICTURE SIGNALS AND OTHER INFORMATION

This is a continuation of application Ser. No. 079,986 filed Sept. 28, 1979.

BACKGROUND OF THE INVENTION

This invention relates to information processing apparatus comprising a memory means for writing information into the memory at times depending on first timing signals, and means for reading information out of the memory at times depending on second timing signals which drift in and out of phase with the first timing signals. The invention was conceived when designing a picture synchronization system for television signals.

Many forms of television picture processing depend for their operation upon the storage of one or more fields of the signal. Examples of types of picture processing which employ storage are: standards conversion; picture synchronization; noise reduction; and picture size reduction and expansion.

Picture storage can be carried out using analog methods, the use of quartz delay lines being an example of this type of storage. However, digital memories are cheaper, more reliable and more compact and most equipment employing picture storage now uses digital semiconductor memory chips with the television signal being converted from analog-to-digital form at the input of the equipment and back to analog at the output.

This invention is particularly, although not exclusively, applicable for use in a picture synchronizer. The purpose of a synchronizer is to re-time a television signal, e.g. one arriving from an outside broadcast, so that its subcarrier, line and field frequencies are identical to some local reference, e.g. the studio camera pictures. At the output of the synchronizer the remote signal can be treated as if it were generated locally and can be mixed, faded, and inserted into local pictures without causing timing disturbance to the transmitted signal.

DESCRIPTION OF THE PRIOR ART

A typical known synchronizer works by writing the incoming signal into the memory at a rate determined by the incoming signal and then reading the signal out of the memory at the rate fixed by a local reference signal. Since there is no frequency or phase relationship between the reading and writing operations, there will be occasions when the reading will overtake the writing or vice-versa. Also there will be occasions when reading and writing operations coincide.

It is a feature of most random access memory systems that, at any instant, only one memory location may be addressed, and that information may be written into or read from the chosen location, but not both together. One known method of overcoming the need for simultaneous writing and reading within a memory chip is to provide storage additional to that strictly needed for one field of the picture. In this way, when an attempt is made to read from and write into the memory at the same time; one of the operations, e.g. writing, is transferred to an additional memory. This known method suffers from the disadvantage that substantial additional memory is required. One object of this invention is to avoid this disadvantage.

SUMMARY OF THE INVENTION

This invention provides a facility for delaying at least some of the writing times so that they do not coincide with the reading times. Thus, the read and write operations are 'interleaved', i.e. the memory is addressed in a read-write-read etc. sequence and no additional memory is required.

The writing times are preferably delayed by varying amounts, chosen so that each writing time is approximately mid-way between reading times.

Since it may be necessary to write information into and read information from the memory at a very fast rate it is preferable to include a serial-to-parallel converter at the input to the memory and a parallel-to-serial converter at the output. This allows the memory sufficient time to register each bit.

When the invention is used in a synchronizer for television signals, the said 'first' i.e. "write" timing signals are preferably generated from the line synchronizing pulses, the field synchronizing pulses and the burst of the signals to be processed, whereas the 'second' timing signals are generated similarly from an independent source. In this particular application of the invention the frequencies of the first and second timing signals are marginally different. This means that they drift into and out of phase with each other. When they are in phase the delay produced in accordance with the invention avoids the memory being instructed to read and write simultaneously. When they are 180° out of phase there is no need for delay.

The change in phase of the 'first' and 'second' timing signals in a television synchronizer is very small during any given line. It is, therefore, satisfactory to set a delay time which remains constant during any given line of the signal to be processed.

The blanking periods, between lines of the video information being read out of the memory are not normally equal to a multiple of the period between reading times. This means that the delay, fixed for a given line of the signal to be processed is inappropriate after the blanking period of the signal being read out of the memory. This problem can be overcome by delaying the writing times by a further fixed amount after the blanking period.

In some other applications of the invention the first and second timing signals can be the same in which case the delay will be fixed value, permanently present. Such would be the case for example in picture size reduction systems and noise reduction systems for television signals.

DETAILED DESCRIPTION

Figure 1:
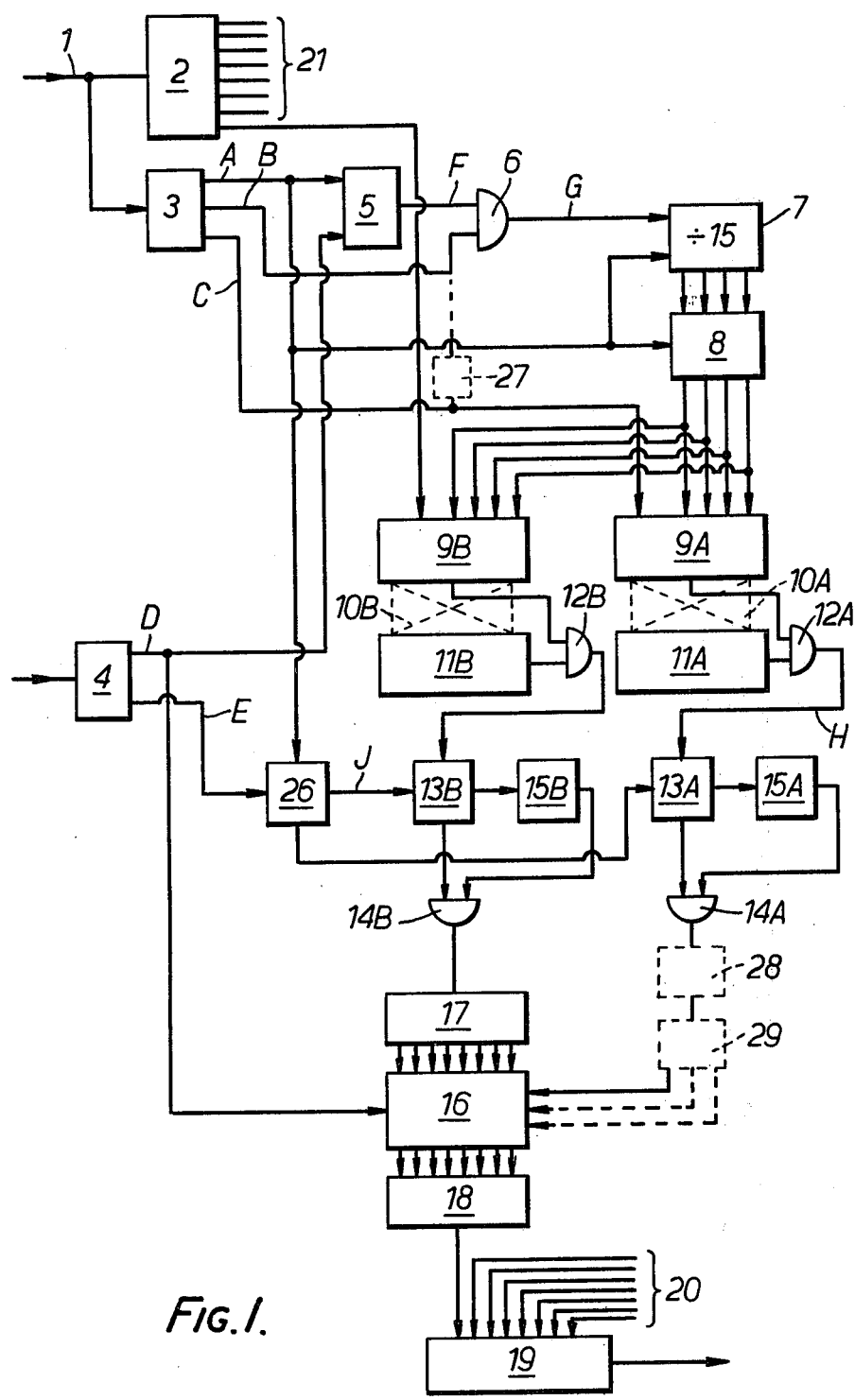
FIG. 1 is a block diagram showing, in full lines, a television picture synchronization device designed to synchronize television signals derived from somewhere outside a studio with signals generated locally, i.e. in the studio; and, in broken lines, a modification applicable when the memory requires more than one write clock.

The circuit of FIG. 1 is designed for use in a television studio and the object is to synchronize a video television signal derived from a remote source with timing signals produced locally in the studio.

The remote signal is received by an input 1 and is digitized by an analog-to-digital converter 2 into 8-bit parallel form, samples being taken at a frequency of three times the frequency of the subcarrier (3 fsc). This video input 1 also drives a timing generator 3 that produces first timing signals constituting line frequency pulses A, 3 fsc clocks B, and write clock pulses C. The write clock pulses C are started by line pulses A and have a period of repetition which is a predetermined number of periods of the 3 fsc clocks B. In the described embodiment this is fifteen times the period of the 3 fsc clocks. Local pulses generated within the studio pass through a second timing generator 4, similar to generator 3. The generator 4 produces second timing signals constituting line pulse E and read clock pulses D. These are similar to A and C respectively, but are not locked to the remote signal.

Figure 2:
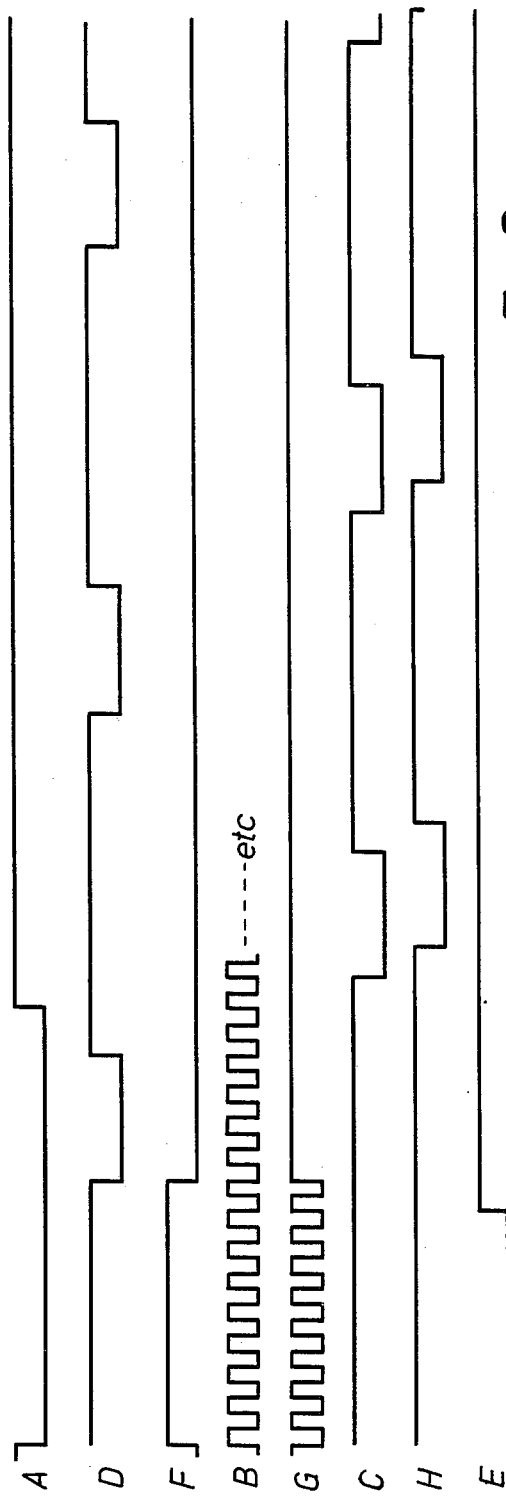
FIG. 2 shows waveforms A, B, C, D, E, F, G and H which are generated at various positions, also indicated on FIG. 1 by the same reference letters.

A comparator 5 compares the phase of the remote line pulses A relative to local read clock pulses D and produces a signal F which opens a NAND gate 6 to pass 3 fsc clock pulses B during a period between the beginning of a pulse A and the beginning of the next pulse D. The number of clock pulses B passed by the gate 6 during this period is a measure of the relative timing of pulses A and D. A divide-by-fifteen counter 7 counts the clock pulses G passed by the gate 6 and the number contained in the counter when the clocks stop is stored in a latch 8 for the duration of a television line. The counter 7 is cleared on each line just before the gate 6 is enabled. FIG. 2 shows a situation where the time difference between the beginning of a pulse A and the beginning of the next pulse D is such that nine clock pulses G are passed to the counter 7. The output of the counter 7, which is in four-bit parallel form, is held for one line period in the latch circuit 8, and the output of the latch circuit is fed to two identical selectors 9A and 9B.

The selector 9A feeds each write clock pulses C to a selected one of fifteen output connections 10A. These connections 10A are connected to respective inputs of a fourteen-bit shift register 11A so as to produce pulses H which are similar to pulses C, but are delayed in accordance with the following table:

| Count held by latch circuit 8 | Delay produced by shift register (No. of periods of clock signals B) |
| --- | --- |
| 0 | 7 |
| 1 | 8 |
| 2 | 9 |
| 3 | 10 |
| 4 | 11 |
| 5 | 12 |
| 6 | 13 |
| 7 | 14 |
| 9 | 1 |
| 10 | 2 |
| 11 | 3 |
| 12 | 4 |
| 13 | 5 |
| 14 | 6 |

When a count of eight is held by the latch circuit 8 the selector 9A feeds the pulses C to one particular output which is connected directly to an OR gate 12A. This means that the pulse H is produced simultaneously with a pulse C; i.e. there is no delay.

The effect of the delays caused by the circuits 7, 8, 9A, 10A, 11A and 12A is to delay the write pulses C by a time such that the leading edges of the delayed write pulses H are approximately half-way between leading edges of the read clock pulse D. The delay is reset for each line of the remote video signals but, except for a fixed adjustment produced by circuits 13A, 14A and 15A to be described later, remains constant during each line.

The delayed write pulses from the gate 14A are fed to the "write clock" input of a random access memory circuit 16. The circuits 28 and 29, shown in broken lines, are not included in this particular embodiment of the invention. They will be referred to later in relation to a modification. Each write pulse enables the memory to receive video information from a serial-to-parallel converter 17.

The video information from one output of the analog-to-digital converter 2 is delayed in exactly the same way as the "write pulses", but by separate circuits 10B, 11B, 12B, 13B, 14B and 15B. These are identical to circuits 10A, 11A, 12A, 13A, 14A and 15A.

The delayed signals, representing one output of the analog-to-digital converter 2 cannot be fed directly to the memory 16 since they occur at a frequency of 3 fsc which is too fast to register in the memory. They are, therefore, converted by circuit 17 into 15-bit parallel form before being entered in the memory 16.

The remote video information stored in the memory 16 is read out by the read clock signal D derived from the local video signal and, therefore, the output from memory 16 is synchronized with the local video signal. Because of the delay introduced by the circuitry, the memory is never required to read and write simultaneously.

The output from the memory is passed to a parallel-to-serial converter 18 and thence to a digital-to-analog converter 19. The latter also receives, through inputs 20, the outputs from seven other circuits, identical to that illustrated, which process signals from the seven other outputs 21 of the analog-to-digital converter 2.

The output of the digital-to-analog converter 19 represents the remote picture signal synchronized with the locally generated signal.

Figure 3:
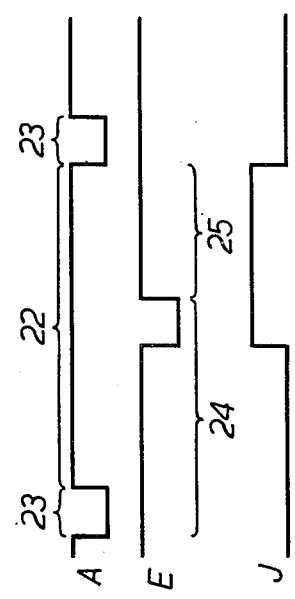
FIG. 3 shows waveform A of FIG. 2 but on a smaller time scale, and also waveforms E and J on the same (smaller) time scale.

FIG. 3 shows at A and E respectively the blanking periods of a line of the remote video signal (before the delay) and of a line of the local video signal. It should be noted that the blanking period shown at E of the local video signal is exactly the same as the blanking period of the remote signal withdrawn after processing from the memory 16. The picture signals of the remote signal occupy a part 22 of the line during which 765 samples are taken from the analog-to-digital converter 2. The blanking period 23 occupies 86.25 sample periods. The signal E is similar, but its blanking period may, and normally will, occur during the picture part of the remote signal. Since the delay to the individual samples of the remote signal is set by the latch circuit 8 for a whole line period, this will be correct only for a time interval indicated at 24. It will be wrong during the time interval 25. This can be corrected by introducing an additional delay during the interval 25. Since the read and write clocks occur every 15 samples, the correct delay is equal to the remainder of 86.25/15 sample periods; i.e. 11.25 sample periods. Thus, an additional delay of this amount is introduced to the remote video signals during the interval 25. This is done by the circuits 26, 13A, 13B, 14A, 14B, 15A and 15B shown in FIG. 1. The comparator 26 receives the remote line pulses A from the timing generator 3 and the local line pulses E from the timing generator 4 to produce an output as shown at J on FIG. 3. When the waveform J is at the low level it sets the switches 13A and 13B in conditions where they connect the outputs of gates 12A and 12B directly to the OR gates 14A and 14B respectively. When the waveform J is at the high level, the switches 13A and 13B are set in conditions such that the outputs of gates 12A and 12B are connected to delay circuits in the form of 11-bit serial registers 15A and 15B. The outputs of these registers are connected to the OR gates 14A and 14B. Thus, during the appropriate interval an additional delay of 11 periods of the waveform B is introduced. This is close enough to the required delay of 11.5 periods to ensure that the read signals at the input to the memory are approximately mid-way between the write signals.

If the memory 16 requires more than one write clock, all three must be delayed by the same amount. A simpler solution is to modify the circuit of FIG. 2 so as to delay the 3 fsc clocks B, instead of the write clocks C. Delayed write clocks can then be generated from the delayed 3 fsc clocks. The necessary additions to the circuit are indicated in broken lines in FIG. 1. Also, the lowermost output of the timing generator 3, as shown in FIG. 1, must be disconnected.

In this modified circuit the input to the selector 9A is connected, through a divide-by-two circuit 27 to receive the 3 fsc pulses B instead of clock pulses C. The divide-by-two circuit 27 is needed simply to enable identical delay circuits to be used to delay the video signals and the clock signals. A multiply-by-two circuit 28 is included to bring the frequency of the delayed signals back to 3 fsc. The output of the circuit 28 drives a clock generator 29 which produces as many clock signals as may be required and feeds them to the memory 16.

We claim:

1. Information processing apparatus comprising digital memory means;
    writing means for writing information in digital form into said memory means at writing times depending on first timing signals;
    reading means for reading the information out of said memory means at reading times depending on second timing signals which drift in and out of phase with respect to the first timing signals; and
    delay means for delaying at least some of the writing times so that they do not coincide with the reading times, said delay means including
    comparator means for producing an output signal in accordance with the phase difference between the first and second timing signals, and
    a variable delay device for delaying the writing times by varying delay periods in accordance with the output signal from said comparator means.

2. An apparatus according to claim 1 wherein said delay means is connected to receive said first and second timing signals, and wherein said delay means delays said writing times by varying amounts whereby each writing time is positioned approximately midway between reading times.

3. An apparatus according to claim 2 wherein said delay means includes counting means arranged to count during a period between a first timing signal and a second timing signal, the delay produced by said delay means being related to the count accumulated by said counting means.

4. Information processing apparatus comprising memory means;
    writing means for writing information into said memory means at times depending on first timing signals;
    reading means for reading the information out of said memory means at times depending on second timing signals which drift in and out of phase with the first timing signals; and
    delay means connected to receive said first and second timing signals for delaying at least some of the writing times so that they do not coincide with the reading times, said writing times being delayed by varying amounts whereby each writing time is positioned approximately midway between reading times, said delay means including counting means arranged to count during a period between a first timing signal and a second timing signal, the delay produced by said delay means being selected to the count accumulated by said counting means.

5. An apparatus according to claim 1, 2, 3 or 4 for processing video signals including means for generating the said first timing signals from said video signals to be processed.

6. An apparatus according to claim 5 wherein said delay means is arranged so that the delay produced by it is reset by line synchronizing pulses of said video signals to be processed.

7. An apparatus according to claim 5 including a fixed delay circuit for further delaying the writing times when they occur during a period after a blanking period of the processed video signal and before the next blanking period of the signal to be processed; this further delay being such that the writing and reading times do not coincide with each other during said first-mentioned period.

8. An apparatus according to claim 5 including an analog-to-digital converter arranged to convert the video signals into digital form, said memory means being converted to receive the digital output of said converter and the output of said memory means being connected to a digital-to-analog converter.

9. An apparatus according to claim 8 wherein said delay means is arranged to delay by equal amounts
    (a) the times when digital codes produced by said analog-to-digital converter are fed to said memory means, and
    (b) said first timing signals which dictate the times at which the digital codes are written into said memory means.

10. A method of processing video signal information comprising the steps of
    writing said video information into memory means at writing times dependent on first timing signals derived from said video signal information;
    reading the information out of said memory means at reading times dependent on second timing signals which drift in and out of phase with respect to said first timing signals; and
    delaying at least some of said writing times so that they do not coincide with said reading times, said writing times being delayed by a period which is reset by line synchronizing pulses of said video signals being processed.

11. A method of processing information comprising the steps of
   writing information in digital form into a memory at writing times dependent on first timing signals;
   reading the information out of said memory at reading times dependent on second timing signals which drift in and out of phase with respect to said first timing signals;
   comparing the phases of said first and second timing signals; and
   delaying at least some of said writing times so that they do not coincide with said reading times, said writing times being delayed by varying delay periods in accordance with the difference obtained from said comparison step between the phases of said first and second timing signals.

12. A method according to claim 11 wherein said information to be processed is in the form of video signals and wherein said first timing signals are derived from the said video signals to be processed.

13. A method according to claim 12 wherein said writing times are delayed by a period which is reset by line synchronizing pulses of said video signals to be processed.

14. A method according to claim 12, 13 or 10 wherein the writing times are further delayed when they occur after a blanking period of the processed video signal and before the next blanking period of the signal to be processed, said further delay being chosen so that the reading and writing times do not coincide with each other during said period.

15. A method according to claim 12, 13 or 10 wherein said video signals are converted into digital codes and fed to said memory means and wherein the digital output of said memory means is converted into analog form.

16. A method according to claim 15 wherein the digital codes are delayed by the same amount as the timing signals.

17. A method according to claim 12, 13, 11 or 10 for synchronizing video signals with synchronising pulses derived independently of the said video signals; wherein said first timing signals are derived from synchronizing pulses belonging to the signal being processed; and said second timing signals are derived from the said independently derived synchronizing pulses.

18. Information processing apparatus comprising
   first timing means for receiving a remote signal, said first timing means generating line frequency and write pulses corresponding to said remote signal;
   second timing means for receiving a local signal and generating read pulses corresponding thereto;
   comparator means coupled to said first and second timing means for generating an output signal corresponding to the phase difference between said line frequency and read pulses;
   delay means coupled to said first timing means and said comparator means for delaying said write pulses in accordance with the phase difference between said line frequency and read pulses;
   memory means having an output, a first input coupled to said delay means for receiving said delayed write pulses and a second input coupled to said second timing generator for receiving said read pulses, the delay generated by said delay means preventing said write and read pulses from being applied simultaneously to said memory means.

* * * * *